US008942875B2

(12) United States Patent
Kusumi et al.

(10) Patent No.: US 8,942,875 B2
(45) Date of Patent: Jan. 27, 2015

(54) SYSTEM AND METHOD FOR DETERMINING STATE OF CHARGE DISPLAY SEGMENTS AND RANGE

(71) Applicant: Toyota Motor Engineering & Manufacturing North America, Inc., Erlanger, KY (US)

(72) Inventors: Hidetoshi Kusumi, Gardena, CA (US); Shota Hirose, Gardena, CA (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 150 days.

(21) Appl. No.: 13/717,416

(22) Filed: Dec. 17, 2012

(65) Prior Publication Data
US 2013/0274974 A1    Oct. 17, 2013

Related U.S. Application Data

(60) Provisional application No. 61/624,135, filed on Apr. 13, 2012.

(51) Int. Cl.
*B60L 11/00* (2006.01)
*B60L 3/12* (2006.01)
*B60L 11/18* (2006.01)

(52) U.S. Cl.
CPC .............. *B60L 3/12* (2013.01); *B60L 11/1861* (2013.01); *B60L 2250/16* (2013.01); *Y02T 10/7044* (2013.01); *Y02T 10/7005* (2013.01); *Y02T 10/705* (2013.01)
USPC .......................................................... 701/22

(58) Field of Classification Search
None
See application file for complete search history.

(56) References Cited

U.S. PATENT DOCUMENTS

| 4,234,840 | A | 11/1980 | Konrad et al. |
| 5,444,378 | A | 8/1995 | Rogers |
| 5,644,194 | A | 7/1997 | Chang |
| 6,242,891 | B1 | 6/2001 | Parsonage |
| 7,039,534 | B1 | 5/2006 | Ryno et al. |
| 7,477,158 | B2 | 1/2009 | Houldsworth et al. |
| 7,652,448 | B2 | 1/2010 | Palladino |
| 8,125,186 | B2 | 2/2012 | Carkner |
| 2009/0309548 | A1 * | 12/2009 | Carkner ........................ 320/136 |
| 2010/0057280 | A1 | 3/2010 | Crowe et al. |
| 2010/0106351 | A1 | 4/2010 | Hanssen et al. |
| 2010/0106353 | A1 | 4/2010 | Watson et al. |

(Continued)

FOREIGN PATENT DOCUMENTS

WO    WO-2012/049756 A1 *  4/2012

*Primary Examiner* — Helal A Algahaim
*Assistant Examiner* — Kelly E Darby
(74) *Attorney, Agent, or Firm* — Snell & Wilmer LLP (57) ABSTRACT

A method and a system for changing the segments of an SOC indicator of a vehicle at non-linear rates or for changing the number of the segments in an on state more slowly when the SOC is high or low as opposed to when the SOC is in the middle range. The system can be implemented with a vehicle including a battery, a sensor, a processor, a controller and a display. The method may include determining a display SOC based on the SOC of the vehicle, providing, by a display, three sets of lights including a low-SOC set, a middle-SOC set, and a high-SOC set, each light is illuminated or de-illuminated based on whether the display SOC has changed by an amount greater than the light's assigned power increment or decrement, where the middle-SOC power increments and decrements are less than the low-SOC or high-SOC power increments and decrements.

20 Claims, 3 Drawing Sheets

(56) References Cited

U.S. PATENT DOCUMENTS

2011/0062913 A1 3/2011 Lin et al.
2011/0071707 A1 3/2011 Crumm et al.
2013/0009764 A1* 1/2013 Yamamoto et al. ........... 340/449

* cited by examiner

SYSTEM AND METHOD FOR DETERMINING STATE OF CHARGE DISPLAY SEGMENTS AND RANGE

CROSS REFERENCE TO RELATED APPLICATIONS

This application claims the benefit and priority of U.S. Provisional Application No. 61/624,135, filed on Apr. 13, 2012, the entire contents of which are hereby incorporated by reference herein.

BACKGROUND

1. Field

The present invention relates to a method and system for changing the state of charge (SOC) segments of an indicator at non-linear rates with respect to a change in an SOC and more particularly to a method and system for increasing or decreasing the number of the segments in an on state more slowly when the SOC is in a high or a low range than when the SOC is in a middle range.

2. Description of the Related Art

With global energy prices rapidly increasing, a user of a vehicle having a rechargeable battery is increasingly interested in evaluating, based on an SOC indicator of the vehicle, the charging capacity of the vehicle, the life of the battery and the distance a full SOC would enable the vehicle to travel. In order to improve the user's experience and satisfaction with the vehicle, manufacturers have sought novel ways to encourage the user to charge the vehicle more frequently. For example, a vehicle in the industry has employed an indicator which provides segments or lights corresponding to the current SOC of the vehicle. As the SOC increases or decreases, the number of the segments in an on state increases or decreases accordingly at a linear rate with respect to a change in power amount or percentage of the SOC.

A drawback of linearly changing the number of the segments in an on state has been that the user loses confidence in the charging capacity of the vehicle when the user fully charges the vehicle to reach a high-SOC range and notices that the number of segments in an on state decreases at a rapid rate upon using the vehicle. Another drawback of linearly changing the number of the segments in an on state is that the user may not have adequate notice to recharge the battery because the number of the low-SOC segments in an on-state decrease as rapidly (i.e., when the SOC or energy is increased or decreased by a smaller amount or percentage) as the number of the SOC segments in an on state decrease in the middle-SOC range (the SOC segments between the low-SOC and the high-SOC segments).

Thus, there is a need for a method and a system directed to increasing or decreasing the SOC segments at varying non-linear rates in order to instill confidence in the user regarding the charging capacity of the vehicle and the life of the battery and to encourage the user to charge the vehicle more frequently. Furthermore, there is a need for a method and a system directed to increasing or decreasing the number of the segments in an on state more slowly when the SOC is a high range or a low range than when the SOC is in a middle range to achieve the objectives set forth above. There is yet another need for a method and a system directed to displaying a full SOC when the SOC of the vehicle is above a certain threshold in order to provide confidence in the life of the battery and the charging capacity of the vehicle.

SUMMARY

The present invention relates to a method and a system for changing the SOC segments of an indicator at non-linear rates with respect to a change in an SOC and more particularly to a method and a system for increasing or decreasing the number of segments in an on state more slowly when the SOC is in a high or a low range than when the SOC is in a middle range. In one embodiment, the present invention may be, for example, a computer-based method for determining a number of lights to illuminate for a state of charge (SOC) of a vehicle. The method may include: determining, using a processor configured to analyze a signal received from a sensor coupled to a battery of the vehicle, an SOC of the vehicle; determining, using the processor, a display SOC based on the SOC of the vehicle; providing, by a display, at least a low-SOC light and a high-SOC light, each light having an on state and an off state and is illuminated or de-illuminated based on the display SOC; assigning, using a charging state data sequence stored in a controller coupled to the display and the processor, a charging state power number to each light such that the charging state power number assigned to the low-SOC light is greater than the difference between the charging state power number assigned to the high-SOC light and the charging state power number assigned to the low-SOC light; and illuminating, using the controller, the low-SOC light when the display SOC increases to a number greater than or equal to the charging state power number assigned to the low-SOC light, and the high-SOC light when the display SOC increases to a number greater than or equal to the charging state power number assigned to the high-SOC light.

In another embodiment, the present invention may be a computer-based method for determining a number of lights to illuminate for a state of charge (SOC) of a vehicle. The method may include: determining, using a processor analyzing a signal received from a sensor coupled to a battery of the vehicle, an SOC of the vehicle; determining, using the processor, a display SOC based on the SOC of the vehicle; providing, by a display, a plurality of lights, each light having an on state and an off state and is illuminated or de-illuminated based on the display SOC; assigning, using a charging state data sequence stored in a controller, a charging state power number to each light of the plurality of lights; and illuminating, using the controller, at least one light of the plurality of the lights when the display SOC increases to a power number greater than or equal to the charging state power number assigned to the at least one light.

In yet another embodiment, the present invention may be a state of charge (SOC) system of a vehicle. The SOC system may include: a battery; a sensor coupled to the battery and configured to measure a voltage, a current, a discharge rate or a temperature of the battery; a processor configured to analyze a signal received from the sensor to determine an SOC of the vehicle and further configured to determine a display SOC based on the SOC of the vehicle; a display configured to provide an indicator having at least a low-SOC segment and a high-SOC segment, each segment having an on state and an off state; and a controller coupled to the processor and the display and configured to: assign, using a charging state data sequence stored in the controller, a charging state power number to each segment such that the charging state power number assigned to the low-SOC segment is greater than the difference between the charging state power number assigned to the high-SOC segment and the charging state power number assigned to the low-SOC segment; and set, using the controller, the low-SOC segment to an on state when the display SOC increases to a number greater than or equal to the charging state power number assigned to the low-SOC segment, and the high-SOC segment to an on state when the display SOC increases to a number greater than or equal to the charging state power number assigned to the high-SOC segment.

BRIEF DESCRIPTION OF THE DRAWINGS

Other systems, methods, features, and advantages of the present invention will be or will become apparent to one with skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

DETAILED DESCRIPTION

Figure 1:
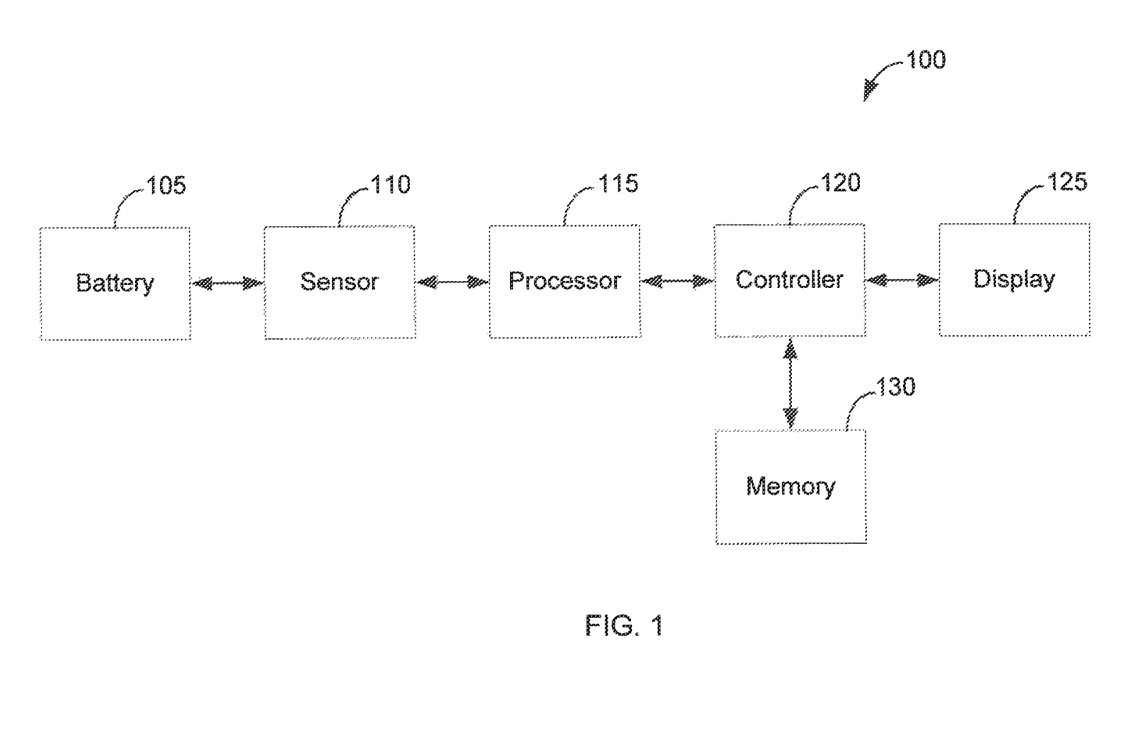
FIG. 1 is a block diagram of a state of charge (SOC) system of a vehicle according to an exemplary embodiment of the present invention.

Referring to FIG. 1, a block diagram is shown of a state of charge (SOC) system 100 of a vehicle according to an exemplary embodiment of the present invention. The system 100 may include a battery 105, a sensor 110, a processor 115, a controller 120, a display 125 and a memory 130. In one embodiment, the processor 115 determines an SOC and a display SOC based on the measurements of the sensor 110 which is connected to the battery 105. In one embodiment, the controller 120 uses the display SOC to determine what number of lights or LEDs to illuminate or what image to display using a data sequence stored as an algorithm or a look-up table in the memory 130. The number of segments, lights or LEDs may be, for example, between 5 and 25. Each set can include 1 to 8 segments, lights or LEDs.

The battery 105 may be any rechargeable battery that is capable of being utilized in a vehicle and may include a plurality of battery cells. The sensor 110 is capable of measuring parameters that are communicated to the processor 115 for determining an SOC of the battery 105 and/or an SOC of the vehicle. The sensor 110 may measure a voltage, a current, a temperature, charge acceptance, an internal resistance, self-discharges, magnetic properties, a state of health and/or other states or parameters of the battery 105. In other embodiments, an SOC may be determined by coulomb counting, quantum mechanism, impedance spectroscopy or a hydrometer. In various embodiments, the processor 115 is or can include a Battery Management System (BMS) which determines the SOC of the battery 105 using the sensor 110. In another embodiment, the system 100 may not include a BMS, and a separate processor 115 may determine the SOC of the vehicle. In yet another embodiment, the processor 115 and the controller 120 may be embedded in a single processor or a control unit in the vehicle.

In one embodiment, the processor 115 may determine an SOC percentage or ratio of the vehicle based on an energy value stored in the battery 105 or the vehicle relative to the current charging capacity of the battery 105 or the vehicle. The stored enemy may be obtained through charging, regenerative braking or other means. In another embodiment, the SOC may be determined based on the stored energy value relative to a reference capacity for the battery 105 or the vehicle. In yet another embodiment, the SOC may be measured as a percentage or a ratio relative to another predetermined value associated with the battery 105 or the vehicle. Other systems or methods known in the art for determining an SOC percentage, value or number may be utilized in the system 100 without limiting the scope of the present invention. In another embodiment, the processor 115 determines a display SOC based on the measured SOC of the vehicle or the measured SOC of the battery 105.

In another embodiment, the processor 115 includes a separate processor from an ECU (Engine Control Unit) of the vehicle which can transmit control signals to relays for selectively activating a connection of the buttery 105 to various loads positioned inside the vehicle. The loads can be, for example, various units or devices of the vehicle having programmable memory items. The ECU may or may not manipulate the SOC or the display SOC. In one embodiment, an ECU may have access to the SOC of the vehicle or the battery 105 for purposes other than controlling the display 125. In other embodiments, the ECU may conduct the operations of the processor 115 and/or the controller 120.

In one embodiment, the processor 115 communicates the monitored parameters including the display SOC to the controller 120 or to an Electronic Control Unit (ECU) using transmission of an electronic signal through a Control Area Network (CAN) bus. In another embodiment, the processor 115, the controller 120 and the display 125 may communicate with one another using the CAN bus which passes through the ECU. In other embodiments, the control and communication may be over various other types of serial communication links, direct wirings, digital communication buses, wireless communications or other communication links. Other systems or methods known in the art for communication and control between the sensor 110, the processor 115, the controller 120 and/or the display 125 may be utilized in the system 100 without limiting the scope of the present invention.

A user is often more concerned with a high-SOC range (e.g., greater than 80%) and a low-SOC range (e.g., less than 20%) than a middle-SOC range (i.e., between the high-SOC and the low-SOC range) in order to evaluate the charging capacity of the battery 105 and the vehicle and to evaluate what distance a high SOC allows the vehicle to travel prior to a full discharge. Rather than increment or decrement the SOC lights in a linear fashion, the system 100 and the method of the present invention adjust the ratio of each segment to be larger when the display SOC is high or low and the ratio of each segment to be smaller when the display SOC is in the middle. As such, the algorithm increases or decreases the number of illuminated lights more slowly when the display SOC is high and low which endows the user with higher confidence in the charging capacity of the battery 105 and the vehicle. The present invention further urges users to charge the vehicle more often in order to have additional stored energy in the vehicle (i.e., distance to travel) when the charge is indicated to be low.

In one embodiment, a full SOC (100% SOC) of the battery 105 is associated with 42.7 kilo Watts-hour (kWh). The full SOC (100% SOC) of the vehicle may be determined to be, for example, 41.8 kWh by accounting for a 0.9 KWh margin between the charging capacity of the battery 105 and the vehicle. The processor 115 determines a display SOC based on the SOC of the vehicle which may or may not be the same value or percentage as the SOC.

In an exemplary embodiment, the processor 115 determines the display SOC to be 100% (fully charged) when the SOC of the vehicle is greater than or equal to an extended charge mode threshold number or percentage. For example, the display SOC value or percentage is equal to the SOC of the vehicle when the SOC corresponds to a total stored energy of less than 35 kW, and when the SOC of the vehicle increases to a power number greater than or equal to 35 kWh (approximately 83.73% of the SOC of the vehicle or approximately 81.97% of the SOC of the battery 105), the display SOC is determined to be 100%. The display SOC is the same as the SOC of the vehicle when the SOC of the vehicle is a full SOC power number (e.g., when the SOC of the vehicle is 100%). In another embodiment, the controller 120 controls the display 125 to display an image in a scheme corresponding to a full charge SOC or to display all of the lights when the SOC percentage reaches a number or a percentage greater than or equal to the extended charge mode threshold number or percentage. In another embodiment, the extended charge mode threshold may be approximately 80% of a full SOC of the vehicle or a full SOC of the battery 105. Other power numbers, values or percentages may be assigned to the extended charge mode threshold without limiting the scope of the present invention. As such, the invention endows the user with higher confidence in the life of the battery 105 which appears to discharge less slowly when all of the lights are illuminated in the extended charge mode.

In one embodiment, the processor 115 periodically (e.g., every 500 milliseconds) determines a current SOC of the vehicle or the battery 105 and a display SOC based on the current SOC. The processor 115 may periodically communicate the display SOC to the controller 120. In another embodiment, the display 125 periodically illuminate or de illuminate the lights based on the display SOC. The controller 120 may determine what image to display using the display 125 or what number of lights to illuminate or de-illuminate based on a data sequence stored as an algorithm or a look-up table. In one embodiment, the data sequence is stored in the memory 130. In the alternative, the memory 130 may be integral to the controller 120. The controller 120 and the memory 130 may reside in an Application Specific Integrated Circuit (ASIC). The ASIC may reside in a wireless modem. In the alternative, the controller 120 and the memory 130 may reside as discrete components in the wireless modem.

Figure 2:
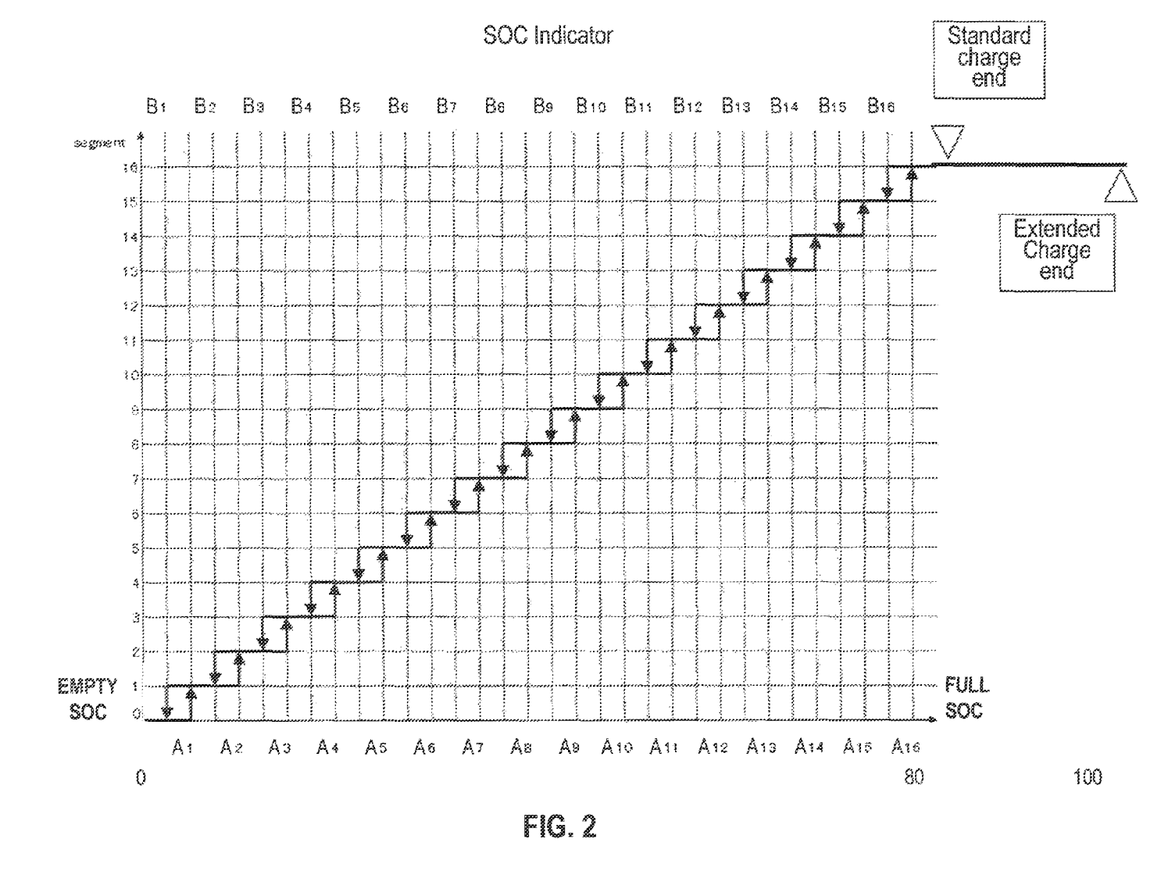
FIG. 2 is a graph showing how the number of SOC indicator segments in an on state are determined based on the changes in the display SOC using a data sequence stored as an algorithm or a look-up table in the memory according to an exemplary embodiment of the present invention.

FIG. 2 is a graph denoting how the number of segments of an SOC indicator in an on state or the number of lights to be illuminated is determined and changed based on the display SOC and a data sequence stored as an algorithm or a look-up table in the memory 130 or the controller 120. The x-axis of the graph shown in FIG. 2 represents the display SOC power percentage, and the y-axis represents the number of lights to be illuminated using the display 125. The downward arrows depict when the number of illuminated lights is decreasing as the vehicle is discharging (decreasing display SOC). The upward arrows depict when the number of the illuminated lights is increasing as the vehicle is charging (increasing display SOC). The A's denote charging state power percentages and the B's denote discharging state power percentages. The difference in percentage value between one A and another A with the next greater power percentage or value is a corresponding power increment, and the difference in percentage value between one B and another B with the next greater power percentage or value is a corresponding power decrement.

In one embodiment, each segment may be an image displayed in either a first display scheme or a second display scheme using the display 125. The first and the second display schemes may differ in color, brightness or other display properties in order to distinguish an on state and an off state of the segment. In another embodiment, the display 125 includes LEDs or other analog or digital lighting devices to be illuminated or de-illuminated based on the display SOC. In one embodiment, when the SOC of the battery 105 is in the high-SOC range, the SOC lights showing the current charge state may illuminate in the color green, when the SOC of the battery 105 is in the middle-SOC range, the SOC lights showing the current charge state may illuminate in the color yellow, and when the SOC of the battery 105 is in the low-SOC range, the SOC lights showing the current charge state may illuminate in the color red. Although the number of lights to be illuminated or de-illuminated is described below, various other analog or digital representations may correspond to the determined number of segments in an on state as shown in FIG. 2.

The controller 120 uses a charging state data sequence stored as a look-up table or an algorithm in the memory 130 or a memory embedded in the controller 120 to determine the associated charging state power amounts or percentages. For example, as the display SOC reaches a percentage of greater than or equal to A1, the light associated with segment 1 ("light 1") is illuminated. As the display SOC reaches a percentage between A1 and A2 (e.g., a percentage between 10% and 19%), light 2 is illuminated. A similar algorithm pattern applies to the lights 3-16 and the corresponding charging state power amounts or percentages in the data sequence (A3 to A16). As the display SOC increases to an amount or percentage greater than A16, the controller 120 controls, by transmission of a signal, the display 125 to illuminate all of the 16 lights.

Similar to the charging state algorithm described above, as the battery 105 and the vehicle discharge from a full display SOC, the 16th light is de-illuminated when the display SOC decreases to a value or a percentage less than or equal to B16. Similarly, lights 1-15 are de-illuminated when the display SOC reduces to an amount or a percentage less than or equal to the corresponding discharging state power amounts or percentages B1 to B15.

The graph as shown in FIG. 2 is not drawn to scale as, for example, the power increment values or percentages in the lowest-SOC range (e.g., A1 or lower), the low-SOC range (e.g., the increment between A2 and A3), the high-SOC range (e.g., the increment between A14 and A15) and the highest-SOC range (e.g., the increment between A16 and a full charge SOC display number) correspond to a higher absolute value or percentage than the power increments in the middle-SOC range (e.g., the increment between A8 and A9). In an embodiment, a similar pattern applies to the power decrements which correspond to higher absolute values or percentages in the lowest-SOC, low-SOC, high-SOC and highest-SOC as compared with the middle-SOC power decrement amounts or percentages. As such, the number of the segments in the on state increases and decreases more slowly in the low-SOC, lowest-SOC, high-SOC and highest-SOC. For example, the lights or segments 1-3 and 13-16 are de-illuminated when the display SOC is decreased by power decrements which may be a display SOC percentage in the range of 4 percent to 13 percent. The lights or segments 4-10 may be de-illuminated when the display SOC is decreased by power decrements which may be a display SOC percentage in the range of 2 percent to 10 percent. In another embodiment, the charging state power amount value or percentage corresponding to the lowest-SOC is further greater than at least a power increment in the low-SOC range.

In one embodiment, the A's and B's are designed to be associated with different numbers or values due to the hysteresis effect. Providing a margin (e.g., at least 1.5% of the display SOC) between the charging state power amount values or percentages (A's) and the discharging state power amount values or percentages (B's) prevents blinking or flashing of the illuminated lights, LEDs or segments. In another embodiment, after the controller 120 determines the number of segments in an on state or the number of the illuminated lights, the controller 120 may transmit signals comprising four binary bits of data corresponding to the determined number of the illuminated lights.

In an embodiment, the controller 120 determines whether to use charging state power amounts or percentages (A's) or discharging state power amounts or percentages (B's) by analyzing a previous display SOC received from the processor 115. For example, if the previous display SOC was 70% and the current display SOC is 73%, the controller 120 determines that the display SOC has increased and uses the data sequence comprising the A's (charging state power amounts or percentages). Otherwise, if the display SOC in the previous state was greater than the current display SOC, the controller 120 determines that the vehicle has been discharging and uses a data sequence stored as a look-up table or an algorithm which includes the discharging state power percentages or amounts (B's). Various other algorithms may be used to determine whether the display SOC has been increasing or decreasing in order to determine whether to compare the display SOC with the charging state or discharging state power amounts or percentages. In other embodiments, no margin may be provided between A values and B values. In yet another embodiment, a single data sequence may contain both charging state and discharging state power numbers which are stored as a look-up table or an algorithm in the memory 130 or in the controller 120.

Figure 3:
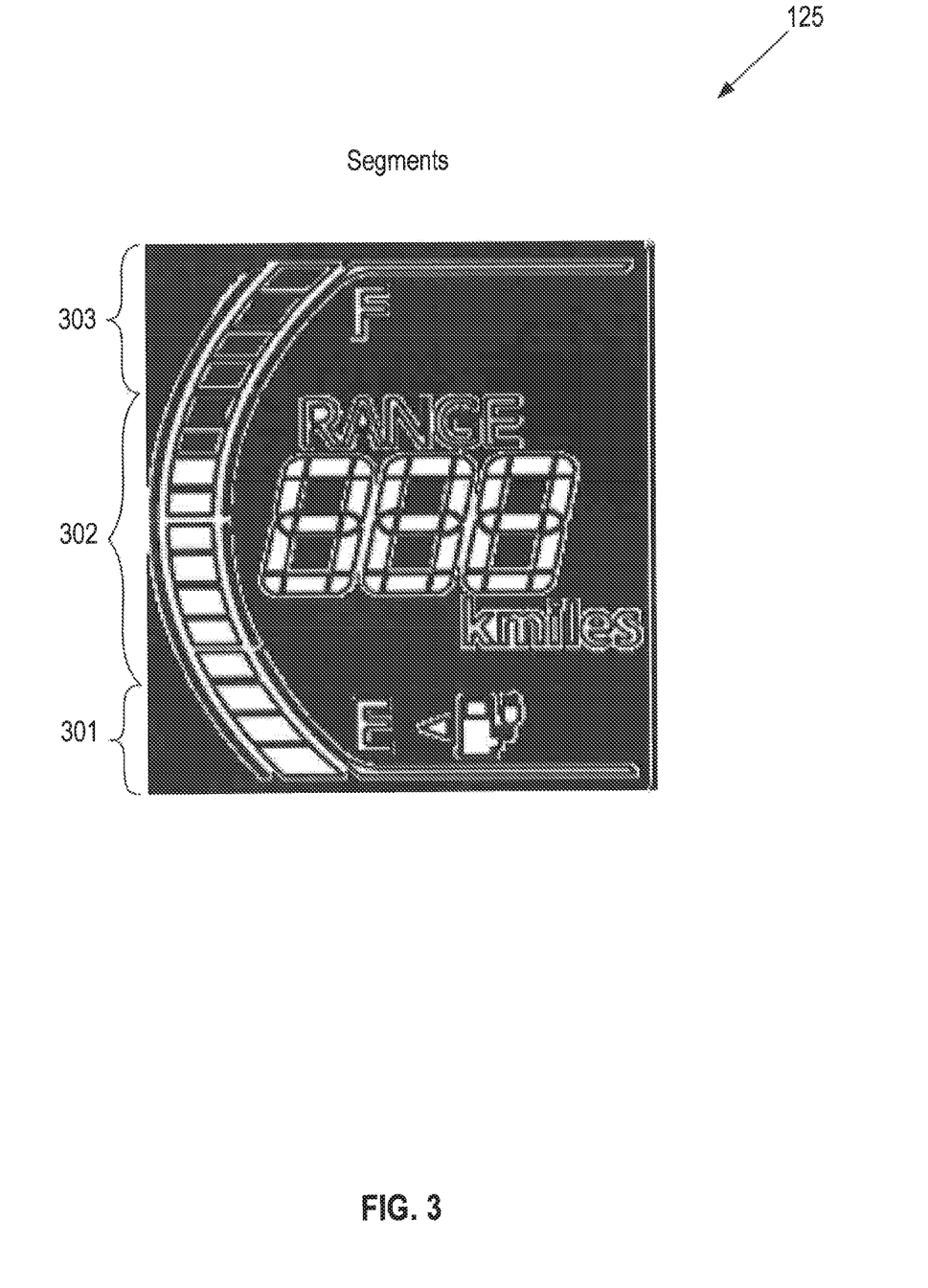
FIG. 3 is a graph showing sixteen segments for the SOC of the vehicle according to an exemplary embodiment of the present invention.

FIG. 3 is a graph showing sixteen segments for the SOC of the vehicle according to an exemplary embodiment of the present invention. Each of these segments may have a first display scheme in an on state and a second display scheme in an off state, and the controller 120 may change the state of each segment based on the display SOC and an algorithm, for example, as disclosed hi FIG. 2. In another embodiment, each segment may be a light which is illuminated in the on state and de-illuminated in the off state. As an example, the lights can be grouped into three sets: a low charge set 301, a middle charge set 302 and a high charge set 303. As shown for example in FIG. 3, there are 16 lights with 3 in the low charge set 301, 9 in the middle charge set 302 and 4 in the high charge set 303. In one embodiment, the lights in the middle charge set 302 are illuminated and de-illuminated more rapidly (e.g., with more or less charge) than the lights in the high charge set 303 and the low charge set 301.

In another embodiment, when the display SOC decreases to a value or percentage less than or equal to an empty SOC threshold value or percentage ("empty SOC" region shown in FIG. 2), the controller 120 transmits a signal to an empty SOC indicator to display an image or to illuminate a light indicating a current empty SOC. For example, an empty SOC indicator in the shape of a gas pump is depicted in the bottom of FIG. 3 next to the "E" indicating an empty SOC which is set to an on state or illuminated when the display SOC decreases to a value or percentage less than or equal to the empty SOC threshold value or percentage. In one embodiment, the controller 120 illuminates an indicator in the shape of a gas pump (as shown in FIG. 3) when the display SOC reduces to a percentage or value below B3 in order to encourage the user to charge the vehicle (or battery 105). In other embodiments, B1, B2, B4 or another value or percentage different from the discharging state power numbers may be assigned to the empty SOC threshold value or percentage.

The logical modules and steps for the system 100 described in connection with the examples disclosed above may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor 115 such that the processor 115 can read information from, and write information to, the storage medium. In the alternative, the storage medium may be integral to the processor 115. The processor 115 and the storage medium may reside in an Application Specific Integrated Circuit (ASIC). The ASIC may reside in a wireless modem. In the alternative, the processor 115 and the storage medium may reside as discrete components in the wireless modem.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A computer-based method for determining a number of lights to illuminate for a state of charge (SOC) of a vehicle, the method comprising:
   determining, using a processor configured to analyze a signal received from a sensor coupled to a battery of the vehicle, an SOC of the vehicle;
   determining, using the processor, a display SOC based on the SOC of the vehicle;
   providing, by a display, at least a low-SOC light and a high-SOC light, each light having an on state and an off state and is illuminated or de-illuminated based on the display SOC;
   assigning, using a charging state data sequence stored in a controller coupled to the display and the processor, a charging state power number to each light such that the charging state power number assigned to the low-SOC light is greater than the difference between the charging state power number assigned to the high-SOC light and the charging state power number assigned to the low-SOC light; and
   illuminating, using the controller, the low-SOC light when the display SOC increases to a number greater than or equal to the charging state power number assigned to the low-SOC light, and the high-SOC light when the display SOC increases to a number greater than or equal to the charging state power number assigned to the high-SOC light.

2. The method of claim 1 further comprising:
   assigning, using a discharging state data sequence stored in the controller, a discharging state power number to each light such that the discharging state power number assigned to the low-SOC light is greater than the difference between the discharging state power number assigned to the high-SOC light and the discharging state power number assigned to the low-SOC light; and de-illuminating, using the controller, the high-SOC light when the display SOC decreases to a number less than or equal to the discharging state power number assigned to the high-SOC light, and the low-SOC light when the display SOC decreases to a number less than or equal to the discharging state power number assigned to the low-SOC light.

3. The method of claim 2 further comprising:

providing, by the display, at least a middle-SOC light having an on state and an off state and is illuminated or de-illuminated based on the display SOC;

assigning, using the charging state data sequence, a charging state power number to the middle-SOC light such that the charging state power number assigned to the low-SOC light is greater than the difference between the charging state power number assigned to the middle-SOC light and the charging state power number assigned to the low-SOC light; and illuminating, using the controller, the middle-SOC light when the display SOC increases to a number greater than or equal to the charging state power number assigned to the middle-SOC light.

4. The method of claim 3 further comprising:

assigning, using the discharging state data sequence, a discharging state power number to the middle-SOC light such that the discharging state power number assigned to the low-SOC light is greater than the difference between the discharging state power number assigned to the middle-SOC light and the discharging state power number assigned to the low-SOC light; and de-illuminating, using the controller, the middle-SOC light when the display SOC decreases to a number less than or equal to the discharging state power number assigned to the middle-SOC light.

5. The method of claim 4 further comprising:

providing, by the display, at least a lowest-SOC light having an on state and an off state and is illuminated or de-illuminated based on the display SOC;

assigning, using the charging state data sequence, a charging state power number to the lowest-SOC light such that the charging state power number assigned to the lowest-SOC light is greater than the difference between the charging state power number assigned to the middle-SOC light and the charging state power number assigned to the low-SOC light, and the charging state power number assigned to the lowest-SOC light is greater than the difference between the charging state power number assigned to the high-SOC light and the charging state power number assigned to the middle-SOC light; and illuminating, using the controller, the lowest-SOC light when the display SOC increases to a number greater than or equal to the charging state power number assigned to the lowest-SOC light.

6. The method of claim 5 further comprising:

assigning, using the discharging state data sequence, a discharging state power number to the lowest-SOC light such that the discharging state power number assigned to the lowest-SOC light is greater than the difference between the discharging state power number assigned to the middle-SOC light and the discharging state power number assigned to the low-SOC light, and the discharging state power number assigned to the lowest-SOC light is greater than the difference between the discharging state power number assigned to the high-SOC light and the discharging state power number assigned to the middle-SOC light; and de-illuminating, using the controller, the lowest-SOC light when the display SOC decreases to a number less than or equal to the discharging state power number assigned to the lowest-SOC light.

7. The method of claim 6 further comprising:

providing, by the display, at least a highest-SOC light having an on state and an off state and is illuminated or de-illuminated based on the display SOC;

assigning, using the charging state data sequence, a charging state power number to the highest-SOC light such that the difference between the charging state power number assigned to the highest-SOC light and the charging state power number assigned to the high-SOC light is greater than the difference between the charging state power number assigned to the high-SOC light and the charging state power number assigned to the middle-SOC light; and illuminating, using the controller, the highest-SOC light when the display SOC increases to a number greater than or equal to the charging state power number assigned to the highest-SOC light.

8. The method of claim 7 further comprising:

assigning, using the discharging state data sequence, a discharging state power number to the highest-SOC light such that the difference between the discharging state power number assigned to the highest-SOC light and the discharging state power number assigned to the high-SOC light is greater than the difference between the discharging state power number assigned to the high-SOC light and the discharging state power number assigned to the middle-SOC light; and de-illuminating, using the controller, the highest-SOC light when the display SOC decreases to a number less than or equal to the discharging state power number assigned to the highest-SOC light.

9. The method of claim 8 further comprising displaying, using the display, an image in a first display scheme or a second display scheme based on whether the display SOC is a number less than a predetermined empty SOC threshold number.

10. The method of claim 9 wherein the display SOC corresponds to a number greater than the SOC of the vehicle when the SOC of the vehicle is greater than or equal to an extended charge mode threshold number and less than a full SOC power number.

11. A computer-based method for determining a number of lights to illuminate for a state of charge (SOC) of a vehicle, the method comprising:

determining, using a processor analyzing a signal received from a sensor coupled to a battery of the vehicle, an SOC of the vehicle;

determining, using the processor, a display SOC based on the SOC of the vehicle;

providing, by a display, a plurality of lights, each light having an on state and an off state and is illuminated or de-illuminated based on the display SOC;

assigning, using a charging state data sequence stored in a controller, a charging state power number to each light of the plurality of lights such that the charging state power number assigned to a low-SOC light is greater than the difference between a charging state power number assigned to a high-SOC light and the charging state power number assigned to the low-SOC light; and illuminating, using the controller, at least one light of the plurality of the lights when the display SOC increases to a power number greater than or equal to the charging state power number assigned to the at least one light.

12. The method of claim 11 further comprising:
assigning, using a discharging state data sequence stored in the controller, a discharging state power number to each light of the plurality of lights; and
de-illuminating, using the controller, at least one light of the plurality of the lights when the display SOC decreases to a power number less than or equal to the discharging state power number assigned to the at least one light.

13. The method of claim 12 wherein at least a power increment, defined as the difference in power number between a charging state power number and the next greater charging state power number in the charging state data sequence, differs in number from at least another power increment between two other charging state power numbers.

14. The method of claim 13 wherein the display SOC corresponds to a number greater than the SOC of the vehicle when the SOC of the vehicle is greater than or equal to an extended charge mode threshold number and less than a full SOC power number.

15. The method of claim 14 further comprising illuminating, using the controller, each light of the plurality of lights when the power number of the SOC of the vehicle is greater than or equal to the extended charge mode threshold number.

16. A state of charge (SOC) system of a vehicle comprising:
a battery;
a sensor coupled to the battery and configured to measure a voltage, a current, a discharge rate or a temperature of the battery;
a processor configured to analyze a signal received from the sensor to determine an SOC of the vehicle and further configured to determine a display SOC based on the SOC of the vehicle;
a display configured to provide an indicator having at least a low-SOC segment and a high-SOC segment, each segment having an on state and an off state; and
a controller coupled to the processor and the display and configured to:
assign, using a charging state data sequence stored in the controller, a charging state power number to each segment such that the charging state power number assigned to the low-SOC segment is greater than the difference between the charging state power number assigned to the high-SOC segment and the charging state power number assigned to the low-SOC segment; and
set, using the controller, the low-SOC segment to an on state when the display SOC increases to a number greater than or equal to the charging state power number assigned to the low-SOC segment, and the high-SOC segment to an on state when the display SOC increases to a number greater than or equal to the charging state power number assigned to the high-SOC segment.

17. The SOC system of claim 16 wherein the controller is further configured to:
assign, using a discharging state data sequence stored in the controller, a discharging state power number to each segment such that the discharging state power number assigned to the low-SOC segment is greater than the difference between the discharging state power number assigned to the high-SOC segment and the discharging state power number assigned to the low-SOC segment; and
set, using the controller, the high-SOC segment to the off state when the display SOC decreases to a number less than or equal to the discharging state power number assigned to the high-SOC segment, and the low-SOC segment to the off state when the display SOC decreases to a number less than or equal to the discharging state power number assigned to the low-SOC segment.

18. The SOC system of claim 17 wherein the display is further configured to provide at least a middle-SOC segment having an on state and an off state, and the controller is further configured to:
assign, using the charging state data sequence, a charging state power number to the middle-SOC segment such that the charging state power number assigned to the low-SOC segment is greater than the difference between the charging state power number assigned to the middle-SOC segment and the charging state power number assigned to the low-SOC segment;
assign, using the discharging state data sequence, a discharging state power number to the middle-SOC segment such that the discharging state power number assigned to the low-SOC segment is greater than the difference between the discharging state power number assigned to the middle-SOC segment and the discharging state power number assigned to the low-SOC segment;
set, using the controller, the middle-SOC segment to the on state when the display SOC increases to a number greater than or equal to the charging state power number assigned to the middle-SOC segment; and
set, using the controller, the middle-SOC segment to the off state when the display SOC decreases to a number less than or equal to the discharging state power number assigned to the middle-SOC segment.

19. The SOC system of claim 18 wherein each segment is an image displayed, using the display, in a first scheme when the corresponding state is set to the on state and in a second scheme when the corresponding state is set to the off state.

20. The SOC system of claim 18 wherein the processor is a battery management system, and each segment is a light which is illuminated, using the controller, when the corresponding state is set to the on state and de-illuminated, using the controller, when the corresponding state is set to the off state.

* * * * *